US008804925B2

(12) United States Patent
Kaal et al.

(10) Patent No.: US 8,804,925 B2
(45) Date of Patent: Aug. 12, 2014

(54) CONTROLLING COMMUNICATIONS

(75) Inventors: Madis Kaal, Tallinn (EE); Henn Ruukel, Tabasalu (EE)

(73) Assignee: Skype, Dublin (IE)

( * ) Notice: Subject to any disclaimer, the term of this patent is extended or adjusted under 35 U.S.C. 154(b) by 453 days.

(21) Appl. No.: 12/941,585

(22) Filed: Nov. 8, 2010

(65) Prior Publication Data

US 2011/0110504 A1 May 12, 2011

(30) Foreign Application Priority Data

Nov. 9, 2009 (GB) .................................. 0919592.6

(51) Int. Cl.
*H04M 11/00* (2006.01)
(52) U.S. Cl.
USPC ........................................ 379/93.01; 709/223
(58) Field of Classification Search
USPC ...................................................... 379/93.02
See application file for complete search history.

(56) References Cited

U.S. PATENT DOCUMENTS

| 6,449,284 | B1  | 9/2002  | Hagirahim            |
|-----------|-----|---------|----------------------|
| 6,654,722 | B1  | 11/2003 | Aldous et al.        |
| 6,904,025 | B1  | 6/2005  | Madour et al.        |
| 6,985,961 | B1* | 1/2006  | Ramsayer et al. ............ 709/238 |
| 7,260,186 | B2  | 8/2007  | Zhu et al.           |
| 7,301,919 | B2  | 11/2007 | Sundquist et al.     |
| 7,526,253 | B2  | 4/2009  | Fujioka              |
| 7,673,001 | B1  | 3/2010  | Battle et al.        |
| 7,693,133 | B2  | 4/2010  | Benco et al.         |
| 7,908,630 | B2  | 3/2011  | Crandall et al.      |
| 8,543,818 | B2  | 9/2013  | Kaal et al.          |

(Continued)

FOREIGN PATENT DOCUMENTS

| EP | 1475939 | 11/2004 |
|----|---------|---------|
| EP | 1592198 | 11/2005 |

(Continued)

OTHER PUBLICATIONS

Patents Act 1977: Search Report under Section 17, Application No. GB0919592.6, Dated Feb. 24, 2011, 1 pg.

(Continued)

*Primary Examiner* — Maria El-Zoobi
(74) *Attorney, Agent, or Firm* — Sonia Cooper; Jim Ross; Micky Minhas

(57) ABSTRACT

A first network comprising: one or more first end-user computer terminals; a gateway to a second, packet-based network comprising one or more second end-user computer terminals installed with a communication client of the second network; one or more telephone units for performing calls with one of the second end-user computer terminals over the second network; wherein each of the one or more first end-user terminals is installed with a communication client for performing calls with the second end-user computer terminals over the second network; and wherein the gateway comprises switching apparatus configured to detect a user selection between a first state in which one of said calls is to be performed using one of said first end-user computer terminals and a second state in which the call is to be performed using one of said telephone units; and on condition of detecting the first state, to route both call set-up signaling and call media to the first end-user computer terminal; and on condition of detecting the second state, to route call set-up signaling to the first end-user terminal but route the call media to the telephone unit.

20 Claims, 6 Drawing Sheets

(56) References Cited

U.S. PATENT DOCUMENTS

| | | | |
|---|---|---|---|
| 2002/0034166 | A1 | 3/2002 | Barany et al. |
| 2003/0023730 | A1 | 1/2003 | Wengrovitz et al. |
| 2003/0058805 | A1 | 3/2003 | Meyerson et al. |
| 2003/0177099 | A1 | 9/2003 | Gallant et al. |
| 2004/0083297 | A1 | 4/2004 | Gazzetta et al. |
| 2004/0194146 | A1 | 9/2004 | Bates et al. |
| 2004/0213201 | A1* | 10/2004 | Osterlund ............... 370/351 |
| 2005/0021872 | A1 | 1/2005 | Poustchi et al. |
| 2005/0034079 | A1 | 2/2005 | Gunasekar et al. |
| 2005/0122963 | A1 | 6/2005 | Jeon et al. |
| 2005/0149481 | A1 | 7/2005 | Hesselink et al. |
| 2005/0268334 | A1 | 12/2005 | Hesselink et al. |
| 2005/0278778 | A1 | 12/2005 | D'Agostino et al. |
| 2006/0013194 | A1 | 1/2006 | Baumann et al. |
| 2006/0034327 | A1* | 2/2006 | Tanimoto ............... 370/466 |
| 2006/0045070 | A1 | 3/2006 | Fotta et al. |
| 2006/0187900 | A1 | 8/2006 | Akbar |
| 2006/0203749 | A1 | 9/2006 | Tseng |
| 2007/0091833 | A1 | 4/2007 | Bauchot et al. |
| 2007/0115348 | A1 | 5/2007 | Eppel et al. |
| 2007/0280200 | A1 | 12/2007 | Patel |
| 2008/0069069 | A1 | 3/2008 | Schessel et al. |
| 2008/0075240 | A1 | 3/2008 | Ramanathan et al. |
| 2008/0081698 | A1 | 4/2008 | Wormald et al. |
| 2008/0091682 | A1 | 4/2008 | Lim |
| 2008/0157998 | A1 | 7/2008 | Zuo et al. |
| 2008/0182546 | A1 | 7/2008 | Wang et al. |
| 2008/0235587 | A1 | 9/2008 | Heie et al. |
| 2008/0239995 | A1 | 10/2008 | Lee et al. |
| 2009/0017792 | A1 | 1/2009 | Matsumoto et al. |
| 2009/0046839 | A1* | 2/2009 | Chow et al. ............. 379/142.01 |
| 2009/0094684 | A1 | 4/2009 | Chinnusamy et al. |
| 2009/0136016 | A1 | 5/2009 | Gornoi et al. |
| 2009/0138697 | A1* | 5/2009 | Kim et al. ............... 713/150 |
| 2009/0168756 | A1 | 7/2009 | Kurapati et al. |
| 2009/0238170 | A1 | 9/2009 | Rajan et al. |
| 2010/0191967 | A1 | 7/2010 | Fujii et al. |
| 2010/0197324 | A1 | 8/2010 | Bolin et al. |
| 2011/0021200 | A1 | 1/2011 | Yi et al. |
| 2011/0119490 | A1 | 5/2011 | Kaal et al. |
| 2011/0242266 | A1 | 10/2011 | Blackburn et al. |
| 2011/0242270 | A1 | 10/2011 | Dinka et al. |
| 2011/0243125 | A1 | 10/2011 | Kaal et al. |
| 2011/0243141 | A1 | 10/2011 | Blackburn et al. |
| 2011/0244955 | A1 | 10/2011 | Dinka et al. |
| 2013/0169736 | A1 | 7/2013 | Lindblom et al. |

FOREIGN PATENT DOCUMENTS

| | | |
|---|---|---|
| EP | 1917776 A1 | 3/2007 |
| EP | 1816843 | 8/2007 |
| EP | 1909467 | 4/2008 |
| EP | 2063612 | 5/2009 |
| EP | 2 088 735 A1 | 8/2009 |
| EP | 2114062 | 11/2009 |
| EP | 2056601 | 8/2011 |
| GB | 2479180 | 10/2011 |
| JP | 200586765 | 3/2005 |
| WO | WO-2004066604 | 8/2004 |
| WO | WO-2005008524 | 1/2005 |
| WO | WO 2005009019 | 1/2005 |
| WO | WO-2005009019 | 1/2005 |
| WO | WO-2006051492 | 5/2006 |
| WO | WO-2006058036 | 6/2006 |
| WO | WO-2007137485 | 6/2007 |
| WO | WO-2007118250 | 10/2007 |
| WO | WO-2007126652 | 11/2007 |
| WO | WO-2008015369 | 2/2008 |
| WO | WO-2009115048 | 9/2009 |
| WO | WO-2010026187 | 3/2010 |
| WO | WO-2010026188 | 3/2010 |
| WO | WO-2010026189 | 3/2010 |
| WO | WO-2010026190 | 3/2010 |
| WO | WO-2010026191 | 3/2010 |
| WO | WO-2010026194 | 3/2010 |
| WO | WO-2010026196 | 3/2010 |
| WO | WO-2011120948 | 10/2011 |
| WO | WO-2011120991 | 10/2011 |
| WO | WO-2011120992 | 10/2011 |
| WO | WO-2011121006 | 10/2011 |

OTHER PUBLICATIONS

Notification of Transmittal of the International Search Report and the Written Opinion of the International Searching Authority, or the Declaration, International Application No. PCT/EP2010/066562, Date of Mailing Feb. 23, 2011, 11 pp.

"International Search Report and Written Opinion", PCT Application PCT/EP2010/066561, (Sep. 26, 2011), 13 pages.

"Bluetooth Profile", downloaded Jun. 28, 2010 from http://en.wikipedia.org/w/index.php?title=Bluetooth_profile &oldid=330823199, accessed Dec. 10, 2009, 9 pages.

"Femtocell", downloaded Jun. 28, 2010 from http://en.wikipedia.org/w/iindex.php?title=Femtocell&oldid=330068819, accessed Dec. 10, 2009, 8 pages.

Final Office Action, U.S. Appl. No. 12/843,543, (Aug. 3, 2012), 8 pages.

International Search Report and Written Opinion, Application No. PCT/EP2011/054781, (May 23, 2011),13 pages.

International Search Report and Written Opinion, Application No. PCT/EP2011/054864, (May 31, 2011),13 pages.

International Search Report and Written Opinion, Application No. PCT/EP2011/054862, (Jun. 27, 2011),17 pages.

International Search Report and Written Opinion, Application No. PCT/EP2011/054881, (Jul. 25, 2011),18 pages.

International Search Report and Written Opinion, PCT Application PCT/EP2011-054879, (Jun. 24, 2011), 13 pages.

"IP-DECT", downloaded Jun. 28, 2010 from http://en.wikipedia.org/w/index.phptitle=IPDECT&oldid=322769463, accessed Dec. 10, 2009, 1 page.

"MagicJack Harnesses Femotocell for VoIP", downloaded Jun. 28, 2010 from http://.pcworld.com/article/186308/magicjack_harnesses_femtocell_for_voip.html, dated Jan. 8, 2010, accessed Feb. 4, 2010, 7 pages.

Non-Final Office Action, U.S. Appl. No. 12/290,232, (Jun. 11, 2012), 16 pages.

Non-Final Office Action, U.S. Appl. No. 12/843,543, (May 29, 2012), 9 pages.

Non-Final Office Action, U.S. Appl. No. 12/843,569, (Apr. 4, 2012), 13 pages.

Preinterview First Office Action, U.S. Appl. No. 12/941,648, (Sep. 28, 2012), 3 pages.

Search Report, Application No. GB1005462.5, (Jul. 28, 2011), 2 pages.

Search Report, Great Britain Application No. GB0919591.8 dated Feb. 23, 2011 (2 pp.).

Notice of Allowance, U.S. Appl. No. 12/941,648, (May 14, 2013), 8 pages.

PCT Search Report and Written Opinion, Application No. PCT/US2012/072025, (Mar. 26, 2012),12 pages.

Supplemental Notice of Allowance, U.S. Appl. No. 12/941,648, (Aug. 26, 2013), 2 pages.

"Voice over IP (VoIP) Phone System Provider, Philadelphia Pa", Retrieved from <http://www.expertta.com/philadelphia-pa-voice-over-ip-system-provider> on Dec. 11, 2012, (Jan. 17, 2010), 2 pages.

Mock, et al., "A Voice over IP Solution for Mobile Radio Interoperability", IEEE 56th Vehicular Technology Conference, Retrieved from <http://ieeexplore.ieee.org/stamp/stamp.jsp?tp= &arnumber=1040433>,(Sep. 24, 2002), 4 pages.

Oprea, et al., "Securing a Remote Terminal Application with a Mobile Trusted Device", *20th Annual Conference on Computer Security Applications*, Retrieved from <http://www.rsa.com/rsalabs/staff/bios/aoprea/publications/acsac.pdf>,(Dec. 6, 2004), 10 pages.

"Extended European Search Report", EP Application No. 12199326.5, Apr. 3, 2013, 6 pages.

* cited by examiner

CONTROLLING COMMUNICATIONS

RELATED APPLICATION

This application claims priority under 35 U.S.C. §119 or 365 to Great Britain Application No. 0919592.6, filed Nov. 9, 2009. The entire teachings of the above application are incorporated herein by reference.

FIELD OF THE INVENTION

The present invention relates to controlling communications in a packet-based network.

BACKGROUND

Some communication systems allow the user of a terminal device, such as a personal computer, to communicate across a packet-based computer network such as the Internet. Such communication systems include voice over internet protocol ("VoIP") systems. These systems are beneficial to the user as they are often of significantly lower cost than conventional fixed line or mobile networks. This may particularly be the case for long-distance communication. To use a VoIP system, the user installs and executes client software on their terminal. The client software sets up the VoIP connections as well as providing other functions such as registration and authentication. In addition to voice communication, the client may also set up connections for other communication media such as video-over-IP calls, instant messaging ("IM"), SMS messaging, file transfer and voicemail.

One type of communication system for packet-based communication uses a peer-to-peer ("P2P") topology. To enable access to a peer-to-peer system, a user executes P2P client software provided by a P2P software provider on their terminal, and registers with the P2P system. When the user registers with the P2P system, the client software is provided with a digital certificate from a server. This may be referred to as a User Identification Certificate (or "UIC"). Once the client software has been provided with the certificate, then calls or other communication connections can subsequently be set up and routed between users of the P2P system without the further use of a server in the set-up. Instead, the client looks up the required IP addresses from information distributed amongst the P2P client software on other end users' computers within the P2P system. That is, the address look-up list is distributed amongst the peers themselves. Once the IP address of a callee's terminal has thus been determined, the caller's P2P client software then exchanges certificates with the callee's P2P client software. The exchange of the digital certificates between users provides proof of the users' identities and that they are suitably authorised and authenticated in the P2P system. Therefore, the presentation of digital certificates provides trust in the identity of the users.

It is therefore a characteristic of peer-to-peer communication that, once registered, the users can set up their own communication routes through the P2P system in an at least partially decentralized manner based on the exchange of one or more digital certificates and/or distributed address look-up, without using a server for those purposes. Further details of an example P2P system are disclosed in WO 2005/009019.

VoIP or other packet-based communications can also be implemented using non-P2P systems that do use centralized authentication and/or call set-up, e.g. with these functions being performed via server.

SUMMARY

Because of the cost savings of packet-based voice or video calls, it would be desirable to extend their use to a business environment. However, this is not just a business aim that can be implemented using existing technology, but rather it presents a technical challenge that will require new technology to achieve.

A problem with packet-based communication systems is that their conventional platform may not be functionally suited for business use. In particular, such systems are most commonly accessed by running a client application on a personal computer, but a busy business user typically may not find this conducive to work against the background of a heavy or fast-paced workload; and may therefore prefer to use a move conventional and familiar, dedicated, stand-alone, landline phone unit to make and answer calls in an office scenario. On the other hand, a business user may find themselves working away from the office. In that case, a dedicated phone unit may not be available, or even if another dedicated landline phone can be found away from the office then it may still suffer from other disadvantages such as not having the business user's contacts stored or not presenting a familiar ID to the callee.

Whilst packet-based communication systems can also be accessed via certain Internet-enabled mobile devices, these generally do not have processing resources or display screens available to offer best quality connections or a full range of features such as video calling.

It would be advantageous to provide an improved network infrastructure that allows for integration of third-party, public-network communication systems with a private network; and which addresses the aforementioned problems with the accessibility of packet-based communication systems.

According to one aspect of the present invention, there is provided a first network comprising: one or more first end-user computer terminals; a gateway to a second, packet-based network comprising one or more second end-user computer terminals installed with a communication client of the second network; one or more telephone units for performing calls with one of the second end-user computer terminals over the second network; wherein each of the one or more first end-user terminals is installed with a communication client for performing calls with the second end-user computer terminals over the second network; and wherein the gateway comprises switching apparatus configured to detect a user selection between a first state in which one of said calls is to be performed using one of said first end-user computer terminals and a second state in which the call is to be performed using one of said telephone units; and on condition of detecting the first state, to route both call set-up signalling and call media to the first end-user computer terminal; and on condition of detecting the second state, to route call set-up signalling to the first end-user terminal but route the call media to the telephone unit.

Thus advantageously, if the user makes or answers a call using a computer terminal such as their desktop or laptop PC, then the call set-up signalling and media will both be routed to and from that computer terminal in order to take full advantage of the benefits of packet-based voice or video calling. On the other hand, if the user prefers to make or answer a call using their dedicated phone unit, then the gateway detects the user's selection and routes the call media to and from the phone unit, but with the software on the computer terminal still acting as an end-point for the purpose of call set-up signalling so as to still be able to participate in the packet-based calling with external clients of the second, external network.

In embodiments, the switching apparatus may be configured to detect said user selection by detecting at least one of: in the case of an incoming call, whether a user answers the incoming call using the first end-user computer terminal or the phone units; and in the case of an outgoing call, whether the user initiates the outgoing call using the first end-user computer terminal or the phone unit.

The switching apparatus may be configured to detect said user selection by receiving at least one of a signal and an absence of a signal from the first end-user computer terminal.

The communication client of the first end-user computer terminal may be configured, if the second state is selected, to transmit a call control signal to the phone unit in order to control the call.

The switching apparatus may comprise a signal processing device configured, if the second state is selected, to decode call media received from the second end-user computer terminal over the second network for routing to the telephone unit.

The switching apparatus may comprise a signal processing device configured, if the second state is selected, to encode call media received from the telephone unit for transmission to the second end-user computer terminal over the second network.

The switching apparatus may comprise a signal processing device configured, if the second state is selected, to transcode call media transmitted between the telephone unit and the second end-user computer terminal.

At least one of the gateway and the client on the first end-user computer terminal may be configured to negotiate a codec for said call media that is common to the second end-user computer terminal and at least one of the phone unit and the first end-user computer terminal.

The negotiation may comprise determining a common subset of codecs, then selecting a codec from said common subset.

The switching apparatus may comprise a signal processing device configured, if the second state is selected, to decrypt call media received from the second end-user computer terminal over the second network for routing to the telephone unit.

The switching apparatus may be arranged to receive and store a decryption key of the second end-user computer terminal for use in decrypting said call media.

The switching apparatus may comprises a signal processing device configured, if the second state is selected, to encrypt call media received from the telephone unit for transmission to the second end-user computer terminal over the second network.

The telephone unit may be a wired telephone unit.

The first network may be a private network and the second network may be a public network.

The call set-up signalling may include at least a call request message.

The call set-up signalling may include at least an authentication procedure.

The communication clients may be peer-to-peer clients and the authentication may comprise exchange of peer-to-peer authentication certificates.

The first network may comprise: a packet-based network portion comprising said one or more first end-user computer terminals and said gateway, and a branch exchange portion comprising said one or more telephone units.

According to another aspect of the present invention, there may be provided a method for use in a first network comprising one or more first end-user computer terminals, a gateway to a second packet-based network comprising one or more second end-user computer terminals installed with a communication client of the second network, and one or more telephone units for performing calls with one of the second end-user computer terminals over the second network; the method comprising: at each of the one or more first end-user terminals, running a communication client for performing calls with the second end-user computer terminals over the second network; detecting a user selection between a first state in which one of said calls is to be performed using one of said first end-user computer terminals and a second state in which the call is to be performed using one of said telephone units; and on condition of detecting the first state, routing both call set-up signalling and call media to the first end-user computer terminal; and on condition of detecting the second state, routing call set-up signalling to the first end-user terminal but route the call media to the telephone unit.

In embodiments, the method may further comprise steps in accordance with any of the above network features.

According to another aspect of the present invention, there may be provided a computer program product for use in a first network comprising one or more first end-user computer terminals, a gateway to a second packet-based network comprising one or more second end-user computer terminals installed with a communication client of the second network, and one or more telephone units for performing calls with one of the second end-user computer terminals over the second network, wherein each of the one or more first end-user terminals is installed with a communication client for performing calls with the second end-user computer terminals over the second network; the program product comprising code embodied on a computer readable medium and configured so as when executed on the gateway to: detect a user selection between a first state in which one of said calls is to be performed using one of said first end-user computer terminals and a second state in which the call is to be performed using one of said telephone units; and on condition of detecting the first state, route both call set-up signalling and call media to the first end-user computer terminal; and on condition of detecting the second state, route call set-up signalling to the first end-user terminal but route the call media to the telephone unit.

In embodiments, the program may be further configured in accordance with any of the above network or method features.

BRIEF DESCRIPTION OF THE DRAWINGS

For a better understanding of the present invention and show how it may be put into effect, reference will now be made by way of example to the accompanying drawings in which.

DETAILED DESCRIPTION OF PREFERRED EMBODIMENTS

Figure 1A:
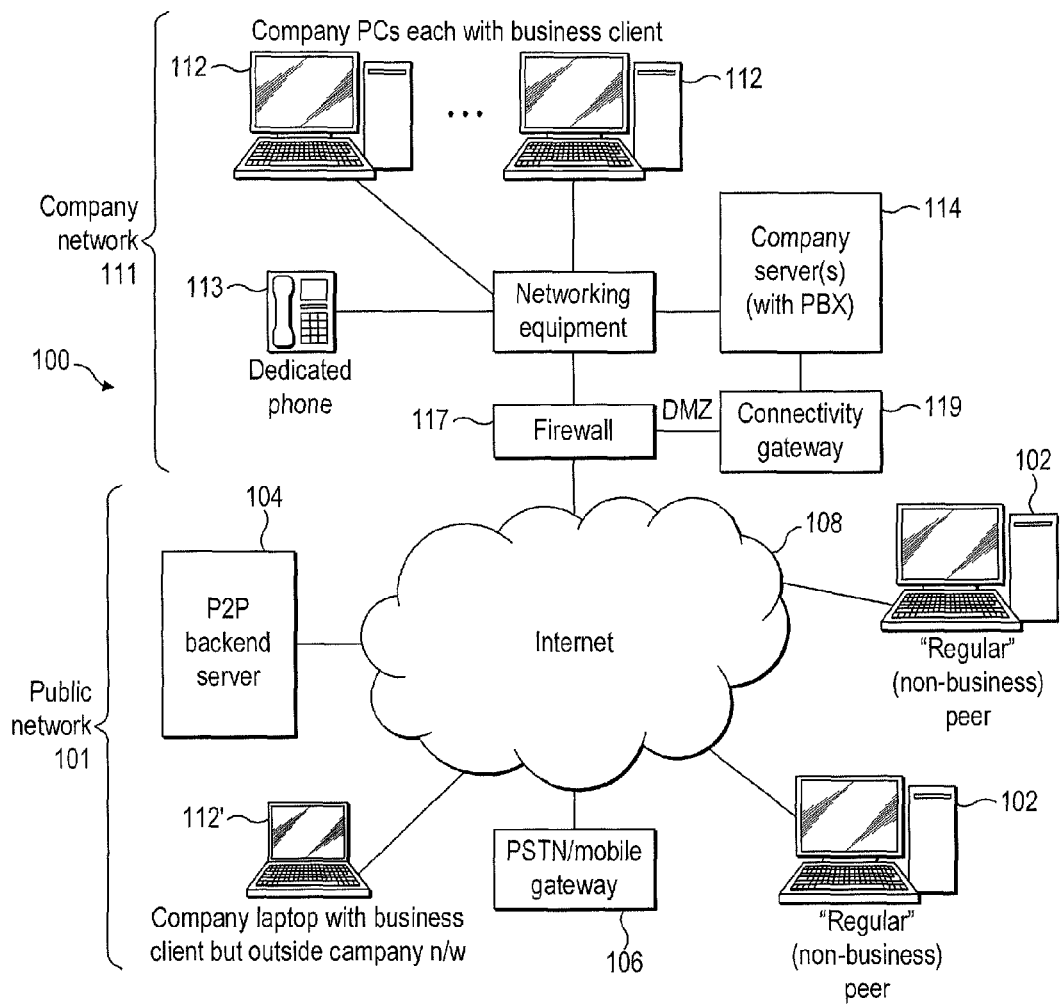
FIG. 1a is a schematic block diagram of a communication system implemented over a public and private network.

FIG. 1a shows part of a peer-to-peer (P2P) communication system 100 implemented over both a public packet-based network 101 and a private packet-based network 111.

The private network 111 is a network such as a local area network (LAN), which is provided by a single network operator and can only be accessed with authorisation from that operator and only that operator. For example, the private network 111 is preferably a company network internal to a particular organisation, and only that company or organisation can authorise access.

The public network 101 on the other hand is an Internet or wide area network (WAN) comprising a plurality of interconnected constituent networks provided by a plurality of different network operators. Thus the public network is not under the control of any one operator, and although a user may have to be authorised to use the access equipment of any one particular service provider, the network is public in the sense that a user can freely approach any of a plurality of different service providers to negotiate access without requiring authorisation from any other service provider or operator. Preferably the public network 101 comprises the Internet.

The private company network 111 comprises one or more company user terminals 112 such as desktop or laptop PCs, one or more dedicated telephone units 113, a company server 114, a firewall 117, and a special connectivity gateway 119. The company network further comprises networking equipment 115 such as one or more routers, to which each of the company user terminals 112, dedicated phone units 113, company server 114 and firewall 117 is coupled. The connectivity gateway is coupled to the firewall 117 and company server 114. Thus each of the company user terminals 112, phone units 113, company server 114, firewall 117 and connectivity gateway 119 is arranged to enable transfer of data with any of the others.

The public network 101 (e.g. the Internet) comprises a plurality of personal user terminals 102 such as desktop or laptop PCs, a P2P backend server 104, and one or more external gateways 106 to another kind of network such as a fixed-line Public-Switched Telephone Network (PSTN) and/or a mobile cellular network. Each of these components is interconnected with the others via a plurality of core network components such as routers and servers of Internet Service Providers (ISPs), Network Service Providers (NSPs) and Internet backbone routers. This is represented schematically in FIG. 1a by a communications cloud 108.

The company network 111 is coupled to the Internet 101 via the firewall and connectivity gateway 119. These form what may be referred to as the company network's DMZ ("Demilitarised Zone", or sometimes "Data Management Zone"). The DMZ is a region of the network that connects it to another external, untrusted network; and according to the preferred embodiments of the present invention the DMZ in this case comprises the additional connectivity gateway 119. The connectivity gateway comprises any suitable first port connecting to the public network 101 and any suitable second port connecting to the private company network 111.

Each of the personal user terminals 102, P2P backend server 104 and connectivity gateway 119 is addressable by a respective IP address. Thus they are enabled to transfer data with one another via the Internet.

The role of the connectivity gateway 119 is to act in conjunction with the company server 114 in order to authorise login of the business users to the P2P communication system and to apply a company-defined policy in relation to any communications undertaken by business users. The connectivity gateway 119 is preferably a separate unit configured to integrate with the company server 114, but it may also be provided as a stand-alone product, or be integrated within the same physical unit as the company server 114. The connectivity 119 gateway may be provided or licensed to the company by a third party.

The company server 114 comprises a PBX (private branch exchange) which provides internal connections amongst the telephone units 113 of the company network 111, and may also connect them to an external PSTN landline. The communication system 100 may also comprise one or more company user terminals 112' outside of the company network 111 and connected directly to the Internet 101.

In order to use the communication system, a user must first log in using a client application. Each of the personal user terminals 102 is installed with a "regular" P2P client application, but each of the company user terminals 112 is installed with a special business version of the client application.

Any personal user terminal 102 running a regular P2P client may be considered a peer or a node of the P2P system. In operation, a peer 102 logs in by supplying an indication of its own username and password to the P2P backend server 104, which validates the password and in response issues the peer 102 with a digital authentication certificate (User Identity Certificate, UIC). Further, the peer 102 also puts together a portion of information referred to herein as its "Node Info", comprising its username and the IP address for the node. The peer 102 then publishes this information onto a P2P distributed database, which is a list of the Node Info for all the peers of the P2P system made available within the P2P system using P2P techniques.

In the case of the regular P2P peer, the full login procedure involving issuance of a UIC from the backend server 104 may only need be performed once upon initial registration, and subsequently the UIC may be stored locally at the peer 102. More preferably however, it may be required that the UIC be renewed periodically, e.g. once every 30 days.

Each peer 102 can query the P2P distributed database to discover the IP address of a particular called contact given knowledge of their username Call set-up signalling can then be performed as follows. A caller uses the IP address retrieved from the distributed database to send a call request message and the caller's own UIC to a callee. The caller and callee then exchange their digital authentication certificates (UICs) in order to authenticate one another.

Once the two peers 102 have authenticated one another, they can establish a bidirectional communication channel therebetween in order to conduct a live, real-time voice or video call. A similar address look-up and call set-up signalling process may be performed to set up channels for other types of communication other than voice or video calls, e.g. IM chat messages or file transfer. Further, a similar process can be used to establish a channel with a client application running on the external gateway 106 in order to make hybrid VoIP calls between a peer 102 and external PSTN landline or cellular mobile phone.

The above procedure may be sufficient (and even preferable) in a purely public environment for personal calls between individuals such as friends or relatives. However, a more comprehensive login and authentication procedure is desirable for a business environment.

Figure 1B:
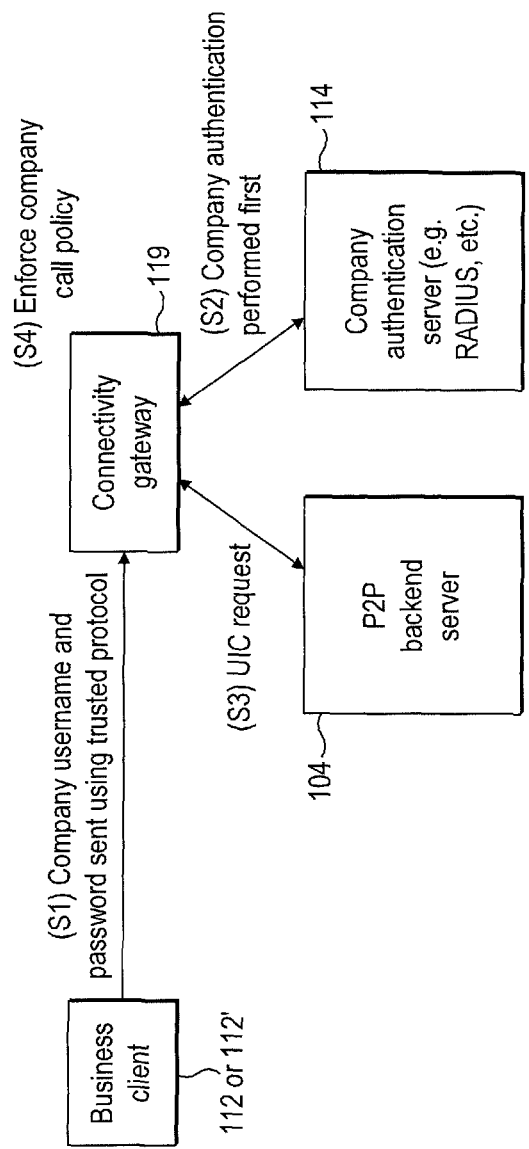
FIG. 1b is a schematic representation of an authentication method.

An exemplary authentication and control process for a company terminal 112 or 112' operating under the influence of a business version of the communication client is now described in relation to FIG. 1b.

The business client is configured such that, when a business user logs in, the corresponding company terminal 112 must first contact the connectivity gateway 119 for authorisation. Thus at step S1, the company terminal supplies an indication of the business user's username and password to the connectivity gateway 119 using a trusted protocol. This is the case even if the business user logs in via a terminal 112' that is currently located outside the company network 111 but is nonetheless installed with the business version of the client.

Before a UIC can be issued, the business terminal 112 or 112' must first be approved by the company server 114. Thus at step S2, the connectivity gateway 119 performs an authentication procedure to authenticate the user of the business terminal 112 or 112'. The company authentication server 114 could use any authentication protocol to do this, e.g. RADIUS, LDAP or NTLM.

The connection between the gateway 119 and the company server 114 may be trusted implicitly by means of a secure connection, or optionally the company server 114 may additionally be required to authenticate itself to the gateway 119.

On condition that the company authentication of the business user is successful, then at step S3 the connectivity gateway 119 contacts the backend server 104 to allow a UIC to be issued to the business terminal 112 or 112'. The business terminal 112 or 112' is then authenticated to participate in the P2P, e.g. to call or otherwise communicate with other regular, non-business peers 102, based on the P2P authentication technique involving exchange of UICs or other such authentication certificates as described above.

As an alternative to the PBX, a company terminal 112 or 112' may also establish a channel with a client application running on the external gateway 106 in order to make hybrid VoIP calls between the company terminal 112 and 112' and external PSTN landline or cellular mobile phone via the Internet 101.

The same company username and password are preferably used for both authentications S2 and S3. Further, note that the backend server 104 preferably need not receive or validate the business user's password but instead blindly trusts the connectivity gateway 119 and company server 114 to have validated the password (unlike the personal case where the backend server 104 does validate the peer's password). However, the option of a separate password validation by the backend server 104 is not excluded.

Note also that preferably, no UICs are stored at the connectivity gateway 119.

The full login procedure involving issuance of a UIC may only be required upon initial registration or only periodically as in the personal use case, but more preferably in the business case the full login procedure described in relation to FIG. 1b is required for each and every login.

In addition to the authentication S1-S3, the connectivity gateway 119 enforces a fourth step S4 of ensuring a company-defined communication control policy is applied to communications or attempted communications involving the business terminals 112 or 112'. The policy is configurable, and stored in the company server 114 to be set by a suitably qualified system administrator. The connectivity gateway 119 refers to the company server 114 in order to apply the configurable, company-defined policy in dependence on company settings. Such a policy could include one or more of:

- Logging the time, duration and/or content of calls or IM chats (with settings to configure whether logging is applied and in what circumstances)
- Blocking login to a personal account with a personal username and password (with settings to configure whether personal login is allowed)
- Blocking calls or communication to certain users or telephone numbers (with settings to configure which users are blocked from communicating with which others and in what circumstances)
- Blocking certain types of communication, e.g. banning IM chat (with settings to configure which types for whom and in what circumstances)
- Call forwarding policy (with settings to configure where calls are forwarded and in what circumstances)
- Controlling whether media is routed via the connectivity gateway 119 (with settings to configure for whom and in what circumstances)
- Presence policy, e.g. how a business user's presence status is displayed, made available or updated (with settings to configure in what manner, for whom and in what circumstances)
- Or generally, notification to any application running on the company server 114 about the business user's communications activity.

There are a number of ways the policy could be enforced.

One way is for the connectivity gateway 119 to trigger the authentication server 114 to download the policy (or at least a part of the policy) to the business terminal 112 or 112' when the business user logs in. Thus when a business user logs in via the business client, then the business client always first contacts the connectivity gateway 119 in order to both ask permission from the company server 114 and apply any calling rules or other such communications policy set by the company server 114. The business client always contacts the connectivity gateway 119 first even if outside the company network 101, e.g. in the case of the laptop 112' shown in FIG. 1a, and regardless of whether the business user logs in using a company username and password or a personal username and password. In this way the policy may be applied on a per-login basis. The business client on the company user terminal 112 or 112' is then configured to always consult the policy upon attempting communication, and make the communication conditional upon the policy and/or performed in accordance with the policy, e.g. by blocking certain communications or providing call log information to the company server 114. In this way, although set at the company server 114, the configurable policy settings may be applied at least partially at the company user terminal 112 or 112' itself.

Another way is to configure the business client on the company user terminal 112 or 112' to always contact the connectivity gateway 119 first upon initiating any outgoing call or other outgoing communication, either by querying the connectivity gateway 119 for permission before performing a call set-up with an external peer 102 directly or by performing the call set-up signalling via the connectivity gateway 119. In this way the configurable communication policy may be applied more directly at the connectivity gateway 119 itself, e.g. by blocking certain communications of logging call set-up or other signalling occurring via the gateway 119.

For incoming calls or other incoming communications, the control may be ensured by publishing an IP address of the connectivity gateway 119 on the distributed database along with each business user's company username in their Node Info, instead of publishing the address of the business user's own terminal 112 or 112' itself. In this case, the regular peer 102 sees the connectivity gateway 119 as the other peer or end-point and does not see inside the private company network 111, i.e. is not aware of its internal structure. Thus when a regular external peer 102 tries to call or communicate with a company user terminal 112 or 112', it is really calling the connectivity gateway 119 and does not know any different.

After the signalling required for call set-up, the media of the call itself (e.g. the live voice or video stream) may or may not be forced to be routed via the connectivity gateway 119, and that fact could be a configurable setting of the company policy. Routing the media via the connectivity gateway 119 could allow further control, e.g. by allowing monitoring of call content. How media is routed is defined in the company policy. Thus either the media may be routed directly between the company user terminal 112 or 112' and the regular peer 102 (not via the connectivity gateway 119), or alternatively the media may be required to be routed via the gateway 119 as an intermediary relay.

In order to accommodate any "legacy" clients still running on external user terminals 102, it may be preferable that an incoming call from an external peer 102 is requested via a published IP address of the connectivity gateway 119, and that media is routed via the connectivity gateway 119. Alternatively or additionally, updated versions of the regular (non-business) client could be put in circulation which recognise an updated call set-up protocol that takes into account the company media routing policy.

Another option would be for the business client on the company user terminal 112 or 112' to set up a communication channel with the external peer 102 directly, but additionally to supply copies of the incoming and/or outgoing media streams to the connectivity gateway 119 or company server 114.

As explained, the route via which media is routed is defined in the company policy. From a perspective of call quality, it is often preferable to route media without the use of an intermediate relaying node. Therefore if the company policy allows direct media routing, then a default may be for the clients at the end-points 102 and 112 or 112' to try to find or negotiate a suitable direct routing between them for the media (if possible or appropriate given network conditions), but if the company policy specifies routing via the gateway then that routing must be enforced.

On a further point, note also that there may be multiple different independent company or private networks 101 connected to the Internet, in which case there may be provided a different connectivity gateway 119 for each different company network, e.g. each having different log-in procedures and/or policies.

Figure 1C:
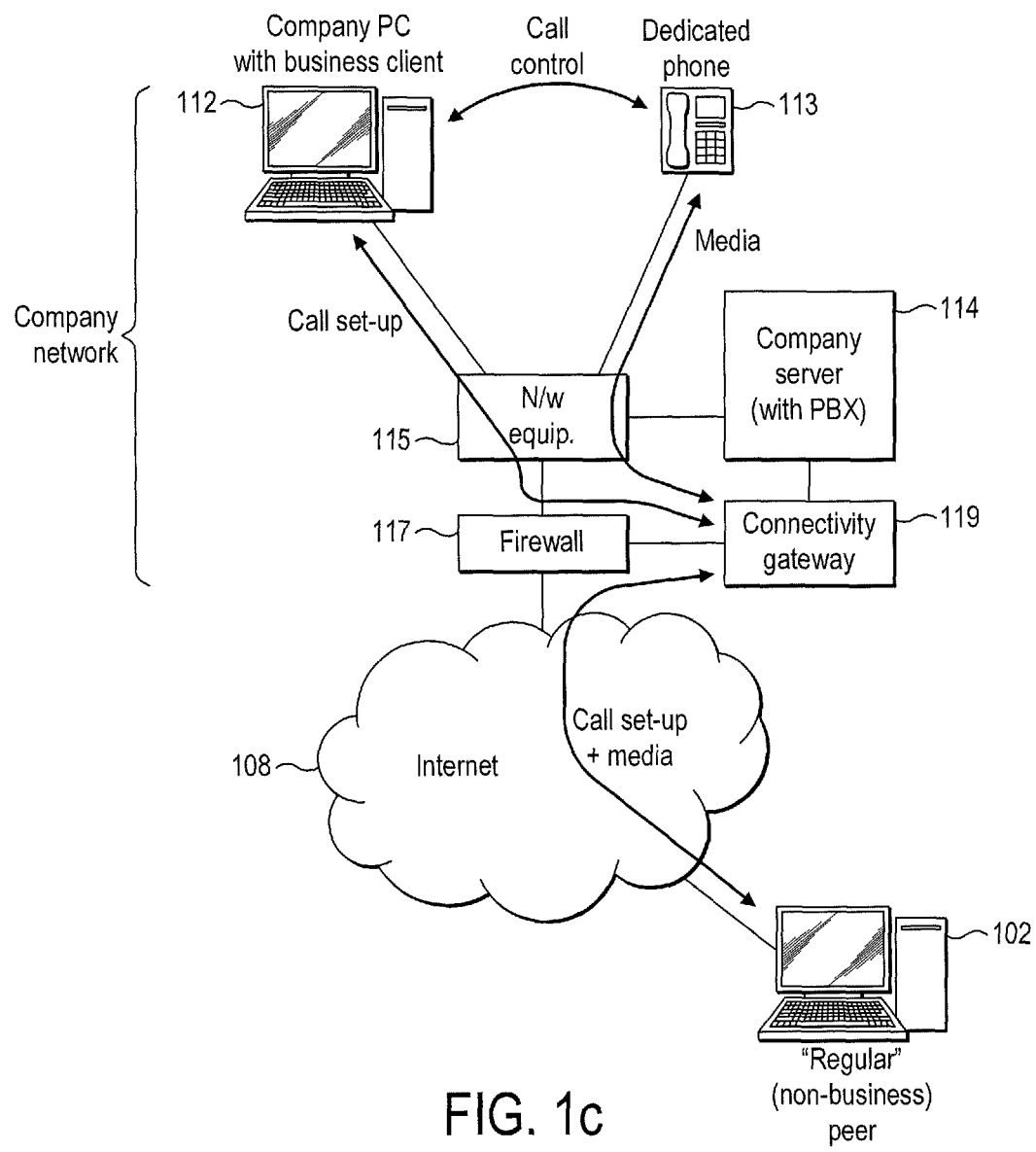
FIG. 1c is a schematic representation of a method of pairing a user terminal with a dedicated phone unit.

In particularly preferred embodiments of the present invention, the connectivity gateway 119 can also act as a peer for a dedicated telephone unit. This is illustrated schematically in FIG. 1c.

Here, the call set-up signalling (preferably including at least a call request and P2P certificate exchange) is performed between the regular peer 102 and the company user terminal 112 or 112', preferably via the connectivity gateway 119. This is the case for both incoming and outgoing calls, and regardless of whether the company user terminal in question is inside or outside the company network 111.

However, the connectivity gateway 119 is advantageously configured such that the routing of the media content itself (the live voice or video stream) within the company network 111 is dependent on which end-user device the business user selects to use to perform the call. If the business user makes or answers a call only using the client of their company computer terminal 112 or 112' then this is the call proceeds as discussed above. But if the business user answers or makes a call on their dedicated phone unit 113 on the other hand, then the connectivity gateway 119 detects this and applies the necessary switching such that: (a) the call set-up is performed using the company computer terminal 112 (preferably including the authentication of the callee, e.g. by authenticating their UIC certificate), but (b) the media itself is streamed to the phone unit 113, and (c) call control signalling is performed between the phone unit 113 and the business client application running on the company computer terminal 112 (e.g. to signal a hang-up). This arrangement may be referred to herein as "pairing".

The phone unit would probably be a conventional audio telephone, but could also be a dedicated video phone (i.e. a terminal having a fixed, pre-configured function as a video call and not having general purpose processing capability).

It is an advantageous feature according to preferred embodiments of the present invention that the connectivity gateway 119 selects whether or not to apply pairing depending on whether the business user answers or makes a call via the client running on their company computer terminal 112/112' or via the dedicated phone unit 113 (or non-P2P endpoint). For example, if the business user is outside the company network 101 then they can't answer an incoming call using their dedicated desk phone 113 and so instead may answer using their laptop 112'.

In the pairing scenario, the connectivity gateway 119 is preferably configured to decode the media stream received from the external peer 102 before routing to the phone unit 113 (which may involve transcoding to encode into another codec suitable for the phone unit 113). Reciprocally, the connectivity gateway 119 is preferably also configured to encode the media stream from the phone unit 113 before routing to the external peer 102 (which may involve transcoding to the codec used for packet-based calls by the external peer 102).

Furthermore, the media itself may be encrypted according to a suitable encryption technique, e.g. in order to prevent eavesdropping attacks (this is a distinct security measure in addition to the exchange of authentication of certificates discussed above). Therefore in the pairing scenario, the connectivity gateway 119 is preferably also configured to obtain the relevant decryption key from the external peer 102, and to decrypt the media stream received from the external peer 102 before routing to the phone unit 113. Reciprocally, the connectivity gateway 119 is preferably also configured to encrypt the media stream from the phone unit 113 before routing to the external peer 102, and supply the relevant decryption key available to the external peer 102. The decryption keys are preferably negotiated between the external peer 102 and business client on the company computer 112 or 112', preferably during call set-up. The relevant key is forwarded to the point where the call media is to be decrypted. Therefore in embodiments the connectivity gateway 119 may obtain the decryption key not directly from the external peer 102, but via the company end-user computer terminal 112 or 112' by its business client forwarding the key to the connectivity gateway 119.

In the pairing arrangement, the decoding and/or decryption of the media stream are not performed by one of the user end-points 112 or 113 because the media is not routed via the company computer terminal 112 and furthermore the dedicated phone unit would not have the processing capability to perform decoding or decryption of voice- or video-over-IP.

Preferably, the connectivity gateway 119 is configured to automatically detect the manner in which a user answers an incoming call, e.g. by detecting whether the user picks up the handset of the dedicated phone unit 113 or operating a suitable user interface control of the business client on the computer terminal 112 or 112'. Further, the connectivity gateway 119 is preferably configured to automatically detect the manner in which a user makes an outgoing call, e.g. by detecting whether the user has picked up the handset of the phone unit 113 or has operated a suitable control of the business client on the computer terminal 112 or 112' (or alternatively detecting whether the user has dialed via the phone unit 113). The connectivity gateway 119 may be configured to then automatically perform the relevant switching required to either put the system into a pairing arrangement or not. In alternative embodiments however, it could be that the pairing decision is determined by a pre-set, user-defined setting, e.g. set at the client of the company computer terminal 112 or 112' by the user of that terminal, or set at the company server 114 by an administrator type user.

The selection decision could be achieved in a number of ways. The gateway could be configured to be aware of the on/off hook status of the telephone unit and/or any relevant status of the company computer terminal 112 or 112', and could thus make a decision at the connectivity gateway 119. Alternatively the decision could be made at the business client on the company computer terminal 112 or 112', such that the connectivity gateway 119 only has to detect an instructing signal (or absence of a signal) from the company computer terminal 112 or 112' in order to perform the switching.

Another issue that arises is that the two end user terminals 102 and 112 or 113 may support different codecs or sets of codecs. There are two possible solutions, as follows.

The first is to find a common subset of codecs supported by both terminals, then negotiate a common codec according to some policy, e.g. the caller's client chooses a preferred codec from the common subset. Either the client on the company computer terminal 112 or the connectivity gateway 119 could be responsible for signalling the supported codecs and performing the negotiation protocol.

The second solution is to translate between codecs on the fly, e.g. using padding. A preferred example of such a technique is described in patent application publication number GB 2,454,606.

Figure 2A:
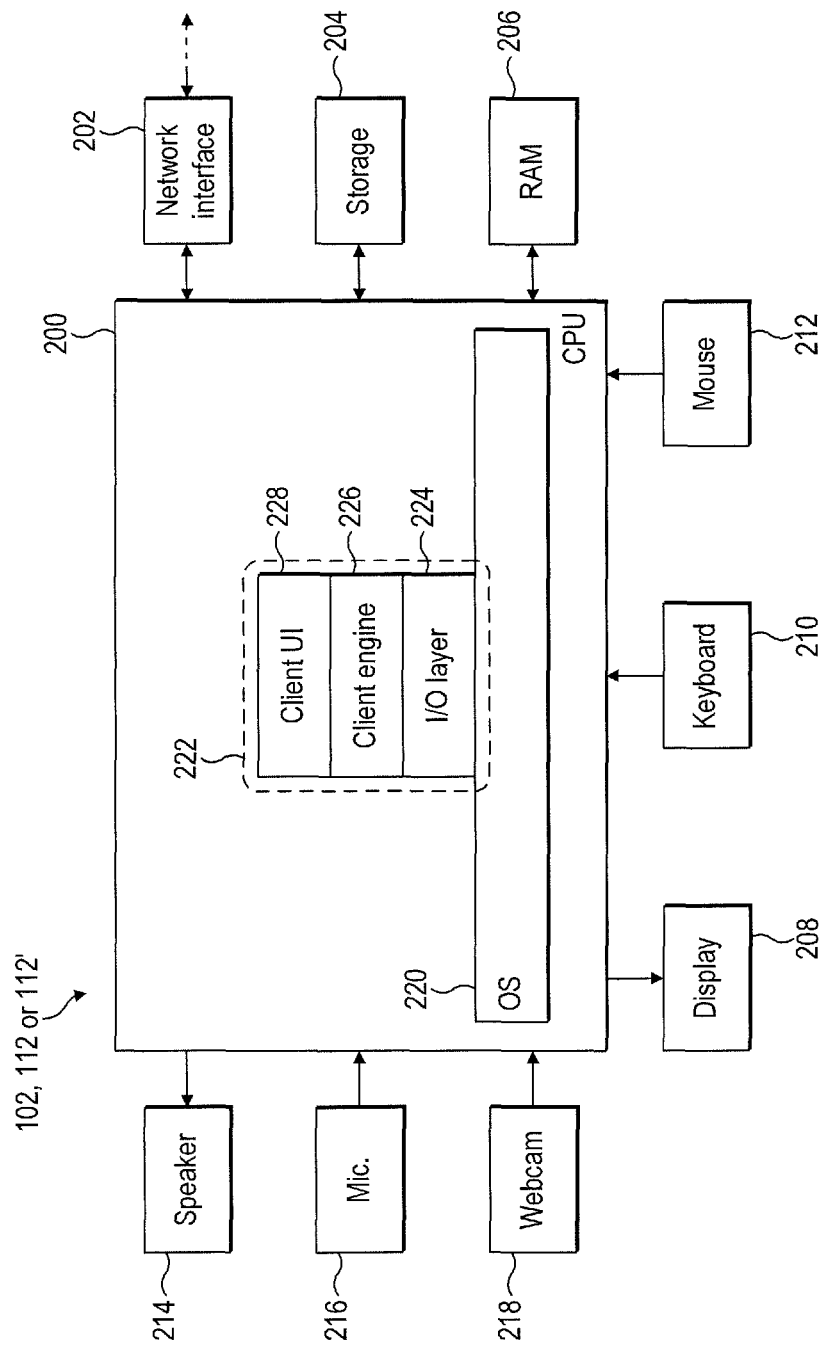
FIG. 2a is a schematic block diagram of a user terminal running a communication client application.

For completeness, the schematic block diagram of FIG. 2a shows an example of an end-user terminal 102, 112 or 112', which is configured to act as a terminal of the P2P communication system operating over the Internet. The terminal 102, 112 or 112' comprises a processor or CPU 200 operatively coupled to: a network interface 202 such as modem for connecting to the Internet 108, a non-volatile storage device 204 such as a hard-drive or flash memory, and a volatile memory device such as a random access memory (RAM) 206. The terminal 102, 112 or 112' also comprises one or more user input devices, for example in the form of a keyboard or keypad 210, a mouse 208, a microphone 216 and a webcam 218, each operatively coupled to the CPU 200. The terminal 102, 112 or 112' further comprises one or more user output devices, for example in the form of a display screen 208 and speaker 214, again each operatively coupled to the CPU 200.

The storage device 204 stores software including at least an operating system (OS) 220, and packet-based communication software in the form of a P2P client application 222. This could be either the regular client or the business version of the client. The storage device may also store other Internet-related software such as a web-browser (not shown). On start-up or reset of the terminal 102, the operating system software 220 is automatically loaded into the RAM 206 and from there is run by being executed on the CPU 200. Once running, the operating system 220 can then run applications such as the web browser application and P2P client application 222 by loading them into the into the RAM 206 and executing them on the CPU 200. To represent this schematically in FIG. 2, the operating system 220 and P2P client application 222 are shown within the CPU 200.

The P2P client application 222 comprises a stack having three basic layers: an input and output (I/O) layer 224, a client engine layer 226, and a user interface (UI) layer 228. Each layer is responsible for specific functions. Because each successive layer usually communicates with two adjacent layers (or one in the case of the top layer), they are regarded as being arranged in a stack as shown in FIG. 2a. The P2P client application 222 is said to be run "on" the operating system 220. This means that in a multi-tasking environment they are scheduled for execution by the operating system 220; and further that inputs to the web browser application and the lowest (I/O) layer 224 of the P2P client application 222 from the input devices 202, 216 and 218 as well as outputs from web browser application and the I/O layer 224 of the P2P client application 222 to the output devices 202, 208 and 214 may be mediated via suitable drivers and/or APIs of the operating system 220.

The I/O layer 224 of the P2P client application comprises audio and/or video codecs which receive incoming encoded streams and decodes them for output to speaker 214 and/or display 208 as appropriate, and which receive unencoded audio and/or video data from the microphone 216 and/or webcam 218 and encodes them for transmission as streams to other end-user terminals 102 of the P2P system. The I/O layer 224 may also comprises a control signalling protocol for signalling control information between terminals 102, 112 or 112' of the network.

The client engine 226 then handles the connection management functions of the P2P system as discussed above, such as establishing calls or other connections by P2P address look-up and authentication. The client engine may also be responsible for other secondary functions of the P2P system such as supplying up-to-date contact lists and/or avatar images of the user to the P2P server 104; or retrieving up-to-date contact lists of the user and retrieving up-to-date avatar images of other users from the P2P server 104. Further, the client engine may retrieve presence information from the other clients of the users.

The UI layer 228 is responsible for presenting decoded video to the user via the display 208, for presenting the output on the display 208 along with other information such as presence and profile information and user controls such as buttons and menus, and for receiving inputs from the user via the presented controls.

Figure 2B:
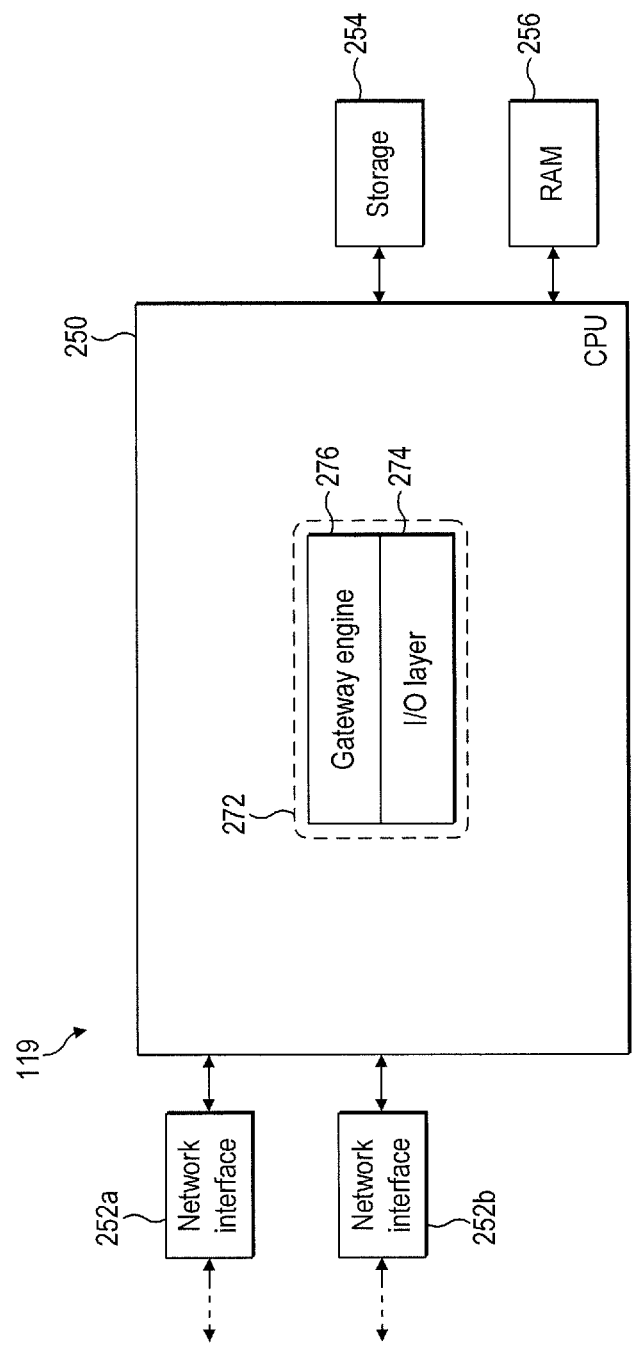
FIG. 2b is a schematic block diagram of a connectivity gateway.

FIG. 2b is a schematic block diagram of the connectivity gateway 119. The connectivity gateway 119 comprises a processing device, preferably in the form of a processing unit 250 coupled to a storage device 254 such as a flash memory or hard drive and to a RAM 256, thus being arranged to fetch and execute dedicated gateway application 272 stored in the storage device 252. The connectivity gateway 119 further comprises a first port 252a coupled to the private network 111 via its private-network company server 114, and a second port coupled 252b coupled to the public network (Internet) 101 via the firewall 117.

The gateway application comprises an I/O layer 274 for performing any necessary encoding, decoding, transcoding, or any necessary encryption or decryption of the media streams that may be required, as discussed above. The I/O layer also provides a control signalling protocol. The gateway engine 276, which is in communication with the I/O layer 274, which is configured so as when executed to perform the higher-level functions discussed above, e.g. to refer to the company server 114 to apply the communication control policy, to mediate the authentication procedures as discussed in relation to FIG. 1b, and to switch into a pairing mode as discussed in relation to FIG. 1c. Information is communicated between the gateway engine 276 and components of the public network 101 via the first port 252 and a suitable signalling protocol of the I/O layer 274, and information is communicated between the gateway engine 276 and components of the private network 111 via the second port 252b and another suitable signalling protocol of the I/O layer 274. The two ports 252 and processing device can together be considered to for a switching apparatus for the purpose of the selective pairing (as well as performing other functions such as the signal processing, e.g. the encoding, decoding, transcoding, encryption and/or decryption).

Alternatively, some or all of the processing device could alternatively be implemented in dedicated hardware. As another alternative, the gateway application could be stored an executed on the private-network company server 114 itself, so that the connectivity gateway 119 is integrated into the same physical unit as that server 114.

Figure 3:
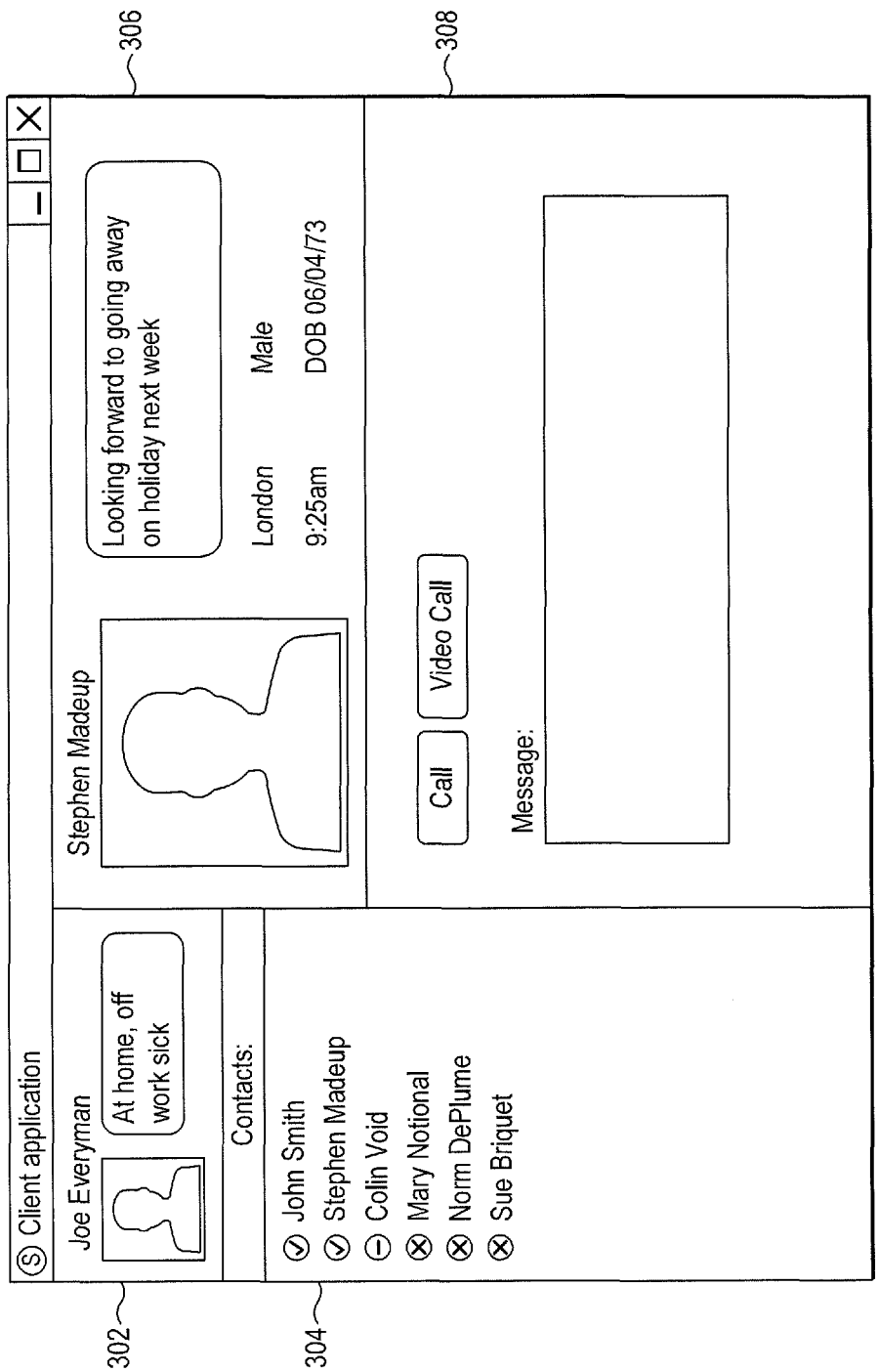
FIG. 3 is a schematic representation of an example user interface for a communication client application.

FIG. 3 illustrates schematically an example user interface as would be presented to a user on the display 208 when the P2P client application 222 is open for viewing by the user. In this example, the user interface 228 is that of the P2P client application 222 running on a first user terminal 102(A). The user interface is divided into a number of panels. A first panel 302 displays some details of the user's own profile, a second panel 304 displays a list of contacts, a third panel 306 displays profile information of one of the contacts, and a fourth panel 308 displays communication controls for initiating a call or IM chat session.

It will be appreciated that the above embodiments have been described only by way of example. For instance, the invention is not limited to use with a P2P system. Other types of public-network communication clients are available it may also be desirable to provide an improved gateway for integrating a system of such clients with a private network. Further, the invention is not limited to any one kind of authentication technique, either for the authentication procedure with the company's private-network server or with the public-network backend server. Various techniques are known in the art for providing a digital certificate, digital signature or other digital authentication of a user's identity, and any such technique could be applicable for authentication with either the company or public communication system. Further, other protocols for call-set and other control signalling could be used. Further, note that where it is referred to a server above, this could in fact refer to one or more server units which need not necessarily be located on the same rack or at the same physical site. Further, note that where it is referred to a gateway or similar, this is not limited to a single gateway unit and could refer to any portion of routing or networking equipment or such like having the relevant functionality, regardless of physical housing or relative location of any component elements. Other configurations and uses of the present invention may be apparent to the person skilled in the art given the disclosure herein. The scope of the invention is not limited by the described embodiments, but only by the appendant claims.

The invention claimed is:

1. A gateway associated with a first network having one or more first end-user computer terminals and one or more corresponding telephone units, the gateway to enable communication with a second, packet-based network comprising one or more second end-user computer terminals installed with a communication client of the second network, the one or more telephone units for performing calls with one of the second end-user computer terminals over the second network the gateway comprising:

a switching apparatus including a processing device and a gateway engine operable via the processing device and configured to:

automatically detect in association with a call whether a user operates one of said first end-user computer terminals or uses one of said telephone units to select respectively between a first state in which the call is to be performed using one of said first end-user computer terminals and a second state in which the call is to be performed using one of said telephone units; and route the call based on the selection between the first state and the second state including:

on condition of detecting user operation of one of said first end-user computer terminals, selecting the first state and routing both call set-up signalling and call media to the first end-user computer terminal; and on condition of detecting use of one of said telephone units, selecting the second state routing call set-up signalling to the first end-user terminal, and routing the call media to the one of said telephone units.

2. The gateway of claim 1, wherein the switching apparatus is configured to perform selection of the state by detecting at least one of: in the case of an incoming call, whether a user answers the incoming call using the first end-user computer terminal or the phone units; and in the case of an outgoing call, whether the user initiates the outgoing call using the first end-user computer terminal or the phone unit.

3. The gateway of claim 1, wherein the switching apparatus is configured to perform said detection by receiving at least one of a signal and an absence of a signal from the first end-user computer terminal.

4. The gateway of claim 1, wherein the communication client of the first end-user computer terminal is configured, if the second state is selected, to transmit a call control signal to the phone unit in order to control the call.

5. The gateway of claim 1, wherein the switching apparatus comprises a signal processing device configured, if the second state is selected, to decode call media received from the second end-user computer terminal over the second network for routing to the telephone unit.

6. The gateway of claim 1, wherein the switching apparatus comprises a signal processing device configured, if the second state is selected, to encode call media received from the telephone unit for transmission to the second end-user computer terminal over the second network.

7. The gateway of claim 1, wherein the switching apparatus comprises a signal processing device configured, if the second state is selected, to transcode call media transmitted between the telephone unit and the second end-user computer terminal.

8. The gateway of claim 1, wherein at least one of the gateway and the client on the first end-user computer terminal is configured to negotiate a codec for said call media that is common to the second end-user computer terminal and at least one of the phone unit and the first end-user computer terminal.

9. The gateway of claim 8, wherein the negotiation comprises determining a common subset of codecs, then selecting a codec from said common subset.

10. The gateway of claim 1, wherein the switching apparatus comprises a signal processing device configured, if the second state is selected, to decrypt call media received from the second end-user computer terminal over the second network for routing to the telephone unit.

11. The gateway of claim 10, wherein the switching apparatus is arranged to receive and store a decryption key of the second end-user computer terminal for use in decrypting said call media.

12. The gateway of claim 1, wherein the switching apparatus comprises a signal processing device configured, if the second state is selected, to encrypt call media received from the telephone unit for transmission to the second end-user computer terminal over the second network.

13. The gateway of claim 1, wherein the telephone unit is a wired telephone unit.

14. The gateway of claim 1, wherein the first network is a private network and second network is a public network.

15. The gateway of claim 1, wherein the call set-up signalling includes at least a call request message.

16. The gateway of claim 1, wherein the call set-up signalling includes at least an authentication procedure.

17. The gateway of claim 16, wherein the communication clients are peer-to-peer clients and the authentication comprises exchange of peer-to-peer authentication certificates.

18. The gateway of claim 1, wherein the first network comprises: a packet-based network portion comprising said one or more first end-user computer terminals and said gateway, and a branch exchange portion comprising said one or more telephone units.

19. A method for use in a first network comprising one or more first end-user computer terminals, a gateway to a second packet-based network comprising one or more second end-user computer terminals installed with a communication client of the second network, and one or more telephone units for performing calls with one of the second end-user computer terminals over the second network; the method comprising:
  detecting at the gateway a signal that indicates whether a user operates one of said first end-user computer terminals or uses one of said telephone units for a call, the signal employed by the gateway to make a selection between a first state in which one of said calls is to be performed using one of said first end-user computer terminals and a second state in which the call is to be performed using one of said telephone units; and
  on condition of detecting the first state, routing by the gateway both call set-up signalling and call media to the first end-user computer terminal; and
  on condition of detecting the second state, routing by the gateway call set-up signalling to the first end-user terminal and routing the call media to the one of said telephone unit.

20. A computer program product for a gateway connected to one or more first end-user computer terminals, in a first network to enable communication with a second packet-based network comprising one or more second end-user computer terminals installed with a communication client of the second network, and one or more telephone units for performing calls with one of the second end-user computer terminals over the second network, wherein each of the one or more first end-user terminals is installed with a communication client for performing calls with the second end-user computer terminals over the second network; the program product comprising code embodied on a computer readable storage device connected to the gateway and configured so as when executed on the gateway to:
  select a first state in which one of said calls is to be performed using one of said first end-user computer terminals or a second state in which the call is to be performed using one of said telephone units based upon automatic determination of whether or not a telephone unit is used for the call; and
  apply pairing to pair the telephone unit with the gateway dependent upon the determination including:
    on condition of selecting the first state, foregoing the pairing and routing both call set-up signalling and call media to the first end-user computer terminal; and
    on condition of selecting the second state, applying the pairing, routing call set-up signalling to the first end-user terminal and routing the call media to the one of said telephone units.

* * * * *